United States Patent
Hardtke

[11] Patent Number: 5,558,447
[45] Date of Patent: Sep. 24, 1996

[54] ROLLER BEARING

[75] Inventor: Hans Hardtke, Zeven, Germany

[73] Assignee: LISEGA GmbH, Germany

[21] Appl. No.: 331,608

[22] PCT Filed: Apr. 30, 1993

[86] PCT No.: PCT/DE93/00396
§ 371 Date: Dec. 8, 1994
§ 102(e) Date: Dec. 8, 1994

[87] PCT Pub. No.: WO93/22572
PCT Pub. Date: Nov. 11, 1993

[30] Foreign Application Priority Data

May 4, 1992 [DE] Germany ............................ 9206032 U

[51] Int. Cl.$^6$ ............................ F16C 13/00; F16C 19/00
[52] U.S. Cl. ............................ 384/418; 193/37; 384/58; 384/549
[58] Field of Search ............................ 384/418, 419, 384/416, 549, 58, 46, 449, 537, 543, 546; 193/37

[56] References Cited

U.S. PATENT DOCUMENTS

| 1,262,338 | 4/1918 | Hart | 384/549 |
|---|---|---|---|
| 2,150,995 | 3/1939 | Tallman | 193/37 X |
| 3,807,817 | 4/1974 | Black | 384/543 |
| 4,078,642 | 3/1978 | Payne | 193/37 |
| 4,981,203 | 1/1991 | Kornylak | 193/37 X |
| 5,054,440 | 10/1991 | Kadokawa | 123/90.5 |
| 5,061,090 | 10/1991 | Kriaski et al. | 384/585 X |
| 5,070,575 | 12/1991 | Redman et al. | 16/96 R |

FOREIGN PATENT DOCUMENTS 533415  4/1958  Belgium ............................ 384/58

Primary Examiner—Thomas R. Hannon
Attorney, Agent, or Firm—Diller, Ramik & Wight, PC

[57] ABSTRACT

In order to simplify the manufacture of a roller bearing (1) in which a cylindrical roller (14) is mounted on a central shaft (3) which extends out beyond the ends of the roller (14) and whose ends (4, 5) are fitted in a mounting (8), the invention proposes that at least the ends of the shaft (3) are hollow and that at least part of the wall (11) of the cavity thus formed is secured in position against the outer surface (12) of the mounting (8) by bending it round or beading it over. This avoids the need for a split-pin to secure the shaft (3).

9 Claims, 1 Drawing Sheet

ROLLER BEARING

BACKGROUND OF THE INVENTION

The invention relates to a rotatable roller bearing in which a cylindrical roller is mounted centrally on a shaft which extends beyond the roller on either side and whose ends are fitted in a mounting.

Roller bearings of this class are used in large numbers, e.g. in the field of material handling or fastening systems.

In this context, the mountings for accommodating the shaft of the roller bearing can be of U-shaped design, with the two limbs of the U-shaped section being provided with drilled holes through which the two ends of the shaft reach.

In order to prevent the shaft shifting in its longitudinal direction, or in order to fix the roller bearing in the mounting, the shaft ends usually have drilled holes, through which, for example, locking pins in the form of split-pins are inserted.

Drilling of these holes during manufacture of the roller bearings necessitates an additional work cycle and increases the cost of the roller bearings accordingly. Furthermore, it can also happen during assembly of the roller bearings that the insertion of the locking pins is forgotten, with the result that the shaft can move in its longitudinal direction and slip out of the mounting during operation.

Furthermore, there is a risk of fitted locking pins being removed by unauthorised persons and of malfunctions arising as a result.

SUMMARY OF THE INVENTION

The invention is based on the task of creating a roller bearing which is inexpensive to manufacture and in which the shaft is reliably prevented from slipping out of the mounting.

This task is solved by at least the end zones of the shaft being of hollow design and at least part of the wall of the cavity being secured in position against the outer surface of the mounting by bending it round or beading it over.

As a result of the hollow design of the end zones of the shaft and the bending round of the wall of the cavity against the outer surface of the mounting, the shaft is already fixed in place in the mounting during manufacture and is secured in the mounting without having to use drilled holes and locking pins. The bending or beading of the wall of the cavity takes place during manufacture of the roller bearing, using familiar forming processes. The shaft is thus fixed in place in the mounting as a result and secured against lateral displacement.

According to the invention, a round steel bar with hollow end zones can be used as the shaft, although it is also possible to use a continuous tube, particularly if the demands on the load-bearing capacity of the roller bearing are not too great.

The outer end zones of the shaft are preferably bent out and round against the outer surface of the mounting in concentric fashion, so that a burr-free, concentric bead is created which lies against the outer surface of the mounting.

In order to prevent lateral displacement of the roller on the shaft, one or more spacers can be arranged between the mounting and the end face of the roller.

The roller can be mounted on the shaft in the familiar manner using rolling elements, or also in sliding fashion. The roller can be free-running, or also of driven design.

The invention is illustrated in exemplary form in the drawings and described in detail below on the basis of the drawings. The drawings show the following:

DESCRIPTION OF THE PREFERRED EMBODIMENTS

Figure 1:
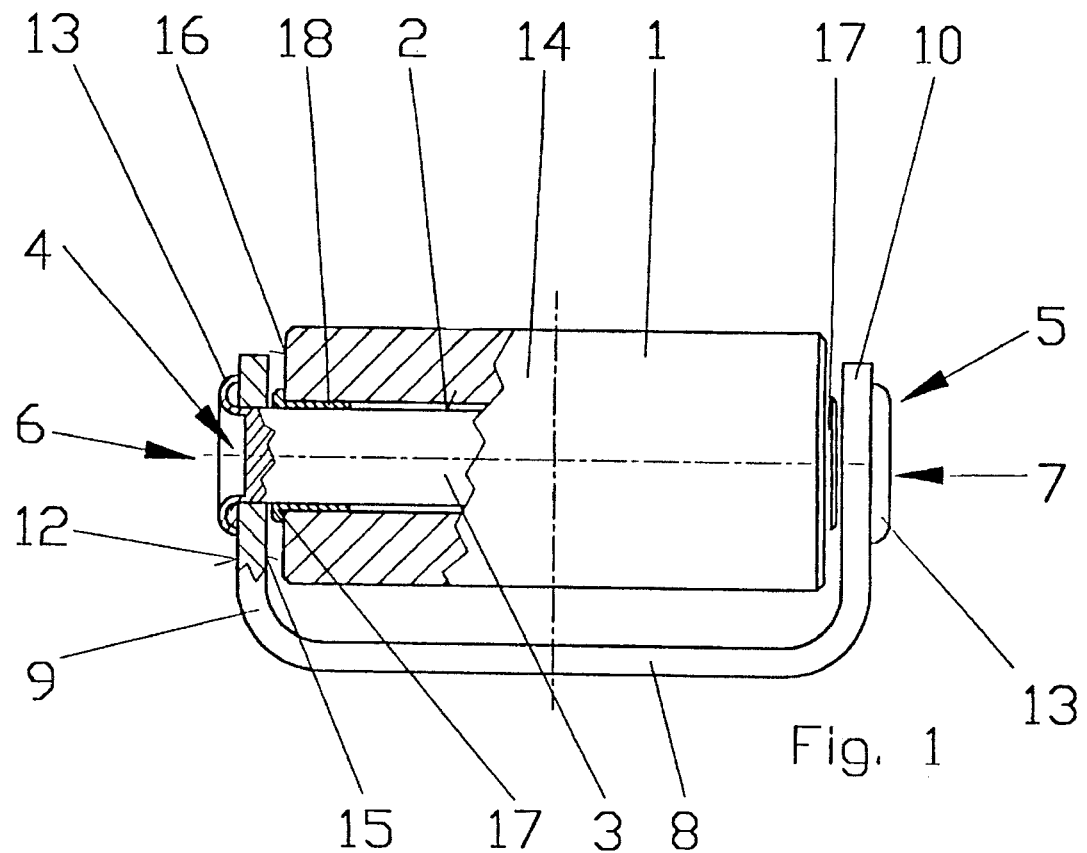
FIG. 1A partially exposed view of a roller bearing whose shaft is arranged in a mounting, and FIG. 2A section through a shaft with the wall of the left-hand cavity beaded over.

The roller bearing 1 illustrated in FIG. 1 is fitted rotatably onto a shaft 3 by means of a drilled hole 2. The two ends 4 and 5 of the shaft 3 reach through throughholes 6 and 7 in a U-shaped mounting 8 with lateral limbs 9 and 10.

The ends 4 and 5 of the shaft 3 are of hollow design, with the wall 11 of the cavity being bent round against the outer surface 12 of the mounting 8. As a result, a concentric bead 13 is created which fixes the shaft 3 in the mounting 8 and prevents lateral displacement of the shaft 3 in the mounting 8.

In order to prevent lateral displacement of the roller 14 on the shaft 3, spacers 17 are located between the inner surface 15 of the mounting 8 and the face end 16 of the roller 14.

Figure 2:
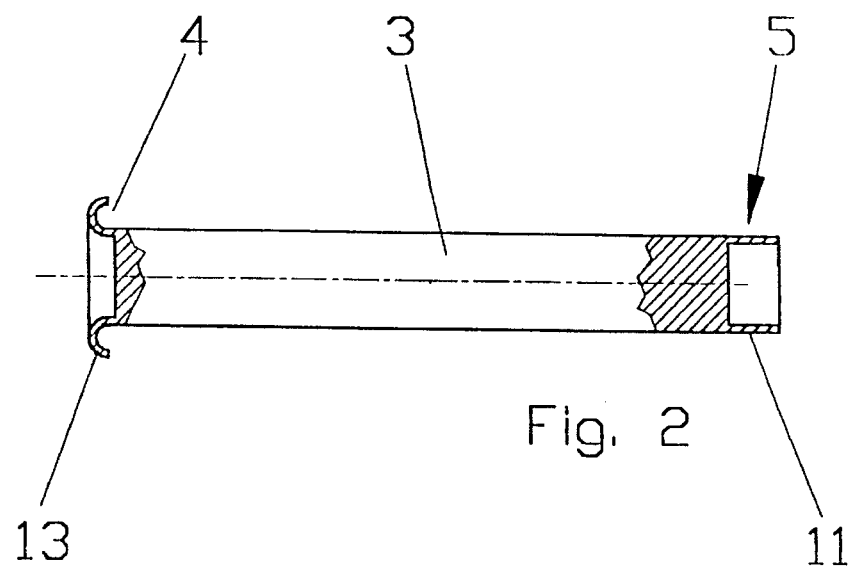

FIG. 2 shows a section through the shaft 3, where the wall 11 of the right-hand cavity is unshaped, while the wall 11 of the cavity of the left-hand shaft end 4 is beaded over to form a concentric bead.

In the practical example illustrated in FIGS. 1 and 2, the shaft 3 consists of solid material with hollow end zones 4 and 5.

Reference numbers

1 Roller bearing
2 Drilled hole
3 Shaft
4, 5 Ends
6, 7 Through-holes
8 Mounting
9, 10 Lateral limbs
11 Wall of the cavity
12 Outer surface
13 Bead
14 Roller
15 Inner surface
16 Face end
17 Spacer
18 Bearing bush

What is claimed is:

1. A rotatable roller bearing comprising a cylindrical roller mounted centrally on a shaft, said shaft having end portions which extend beyond the roller on opposite sides thereof, said shaft end portions being fitted in a mounting having remote outer surfaces and more adjacent inner surfaces, at least said shaft end portions each including a wall defining a substantially hollow cavity, the wall of each cavity being secured in position against an adjacent outer surface of the mounting by bending each end wall of the shaft concentrically outward against the adjacent outer surface of the mounting in the form of a concentric bead.

2. The rotatable roller bearing as defined in claim 1 wherein the shaft is a tube.

3. The rotatable roller bearing as defined in claim 2 wherein the cylindrical roller includes axially spaced end faces, and at least one spacer position between each end face and the mounting adjacent inner surface.

4. The rotatable roller bearing as defined in claim 1 wherein the cylindrical roller includes axially spaced end faces, and at least one spacer positioned between each end face and the mounting adjacent inner surface.

5. The rotatable roller bearing as defined in claim 1 wherein each circular bead is defined by radially innermost and radially outermost radius portions joined by a medial radius portion therebetween; and said inner, outer and medial radius portions collectively define a concentric channel of each concentric bead.

6. The rotatable roller bearing as defined in claim 5 wherein the cylindrical roller includes axially spaced end faces, and at least one spacer positioned between each end face and the mounting adjacent inner surface.

7. The rotatable roller bearing as defined in claim 1 wherein each concentric bead is defined by radially innermost and radially outermost radius portions joined by a medial radius portion therebetween; said inner, outer and medial radius portions collectively define a concentric channel of each concentric bead, and each radially outermost radius portion terminates in a free edge contiguously opposing a mounting adjacent outer surface.

8. The rotatable roller bearing as defined in claim 7 wherein the cylindrical roller includes axially spaced end faces, and at least one spacer positioned between each end face and the mounting adjacent inner surface.

9. The rotatable roller bearing as defined in claim 1 wherein said mounting remote outer surfaces are in substantially parallel relationship to each other, and each concentric bead includes a concentric terminate edge bearing against one of said parallel mounting remote outer surfaces.

* * * * *